June 14, 1966    E. R. VON KREIDNER ETAL    3,255,725
SAFETY SIGNAL FOR AUTOMOTIVE VEHICLES
Filed July 23, 1964
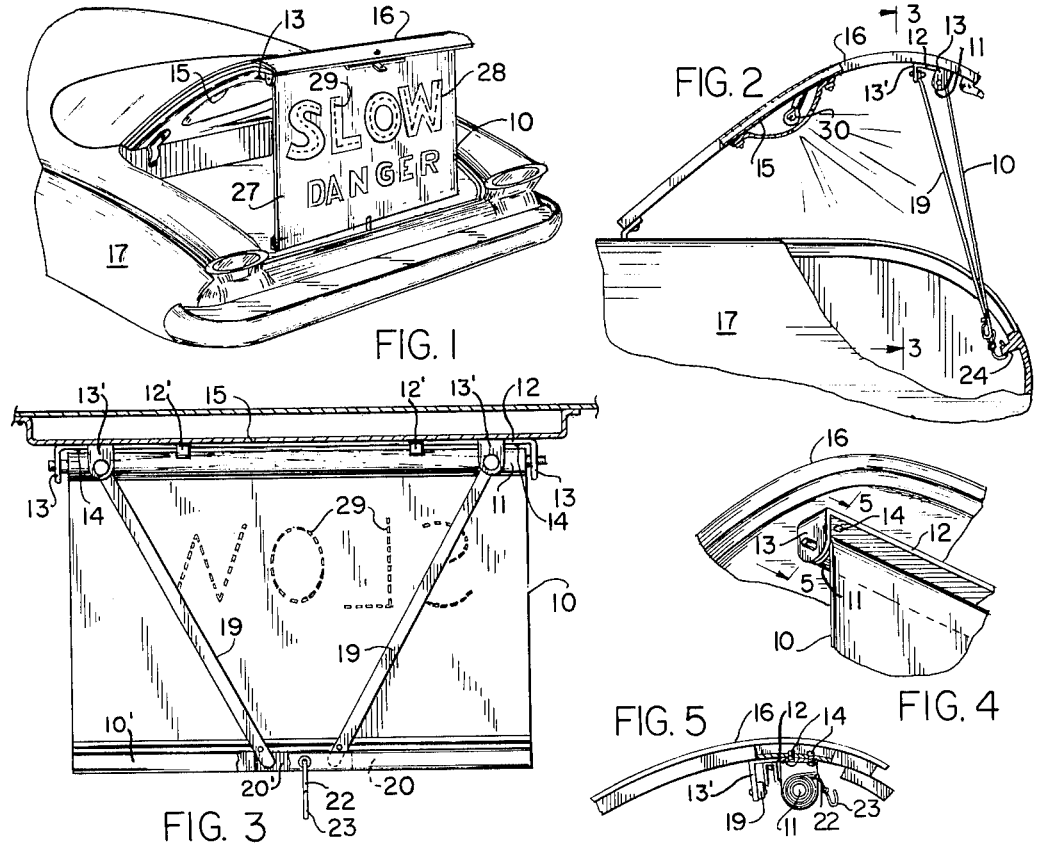
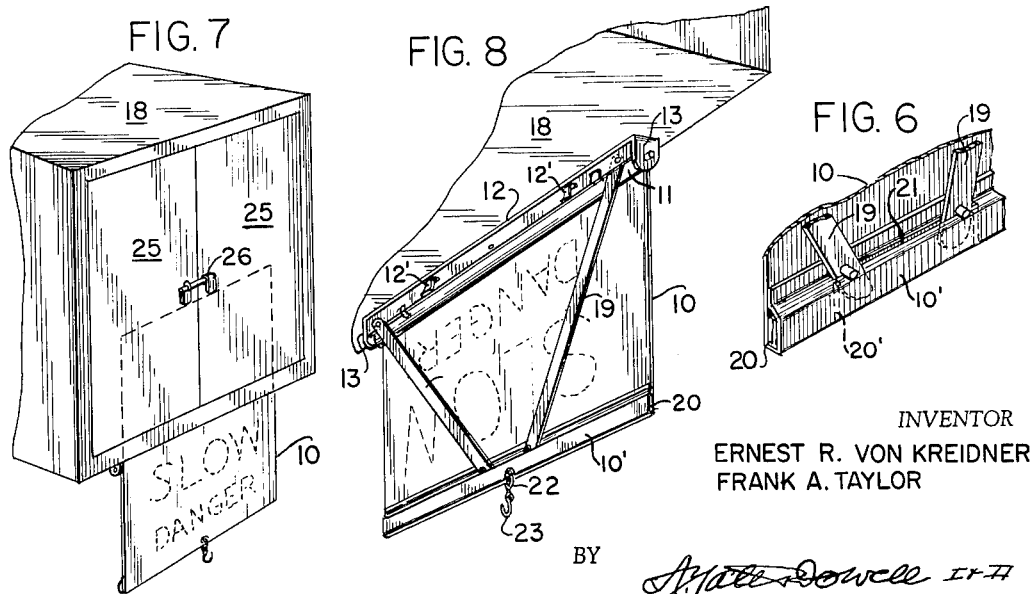
INVENTOR
ERNEST R. VON KREIDNER
FRANK A. TAYLOR

United States Patent Office 3,255,725
Patented June 14, 1966

3,255,725
SAFETY SIGNAL FOR AUTOMOTIVE VEHICLES
Ernest R. Von Kreidner, 332 S. County Road, Palm Beach, Fla., and Frank A. Taylor, 128 E. Lakewood Road, West Palm Beach, Fla.
Filed July 23, 1964, Ser. No. 384,635
3 Claims. (Cl. 116—28)

This invention relates to safety devices designed for preventing accidents and injuries to persons and property due to inadequate warning, especially to approaching vehicles when for some reason it is necessary to stop along the highway, including for repairs to pneumatic tires or other parts of a vehicle.

The invention relates particularly to a safety warning signal for automotive or other vehicles which can be readily seen at a sufficient distance by an approaching or overtaking vehicle traveling at a high rate of speed to avoid a collision which could result in damage to persons and property, such safety warning signal being readily displayable when occasion demands.

Much injury both to persons and property and even loss of life has been occasioned by vehicles traveling at a high rate of speed striking stationary vehicles or objects along the highway or elsewhere occasioned by the inability of the driver of the approaching vehicle to see the stationary vehicle or object in sufficient time to avoid a collision. Therefore it is highly desirable to provide a safety warning signal which can be quickly displayed and of a size and character to be visible at a great distance.

It is an object of the invention to provide a safety warning signal for automotive vehicles, trucks, trailers, and other objects, located on or near streets and highways where traffic moves, as well as a safety warning signal capable of being mounted in an appropriate manner, as for example, normally concealed within the lid of a trunk of an automobile or attached to or beneath the rear of a truck, trailer or the like, with such signal of a character to occupy minimum space when not in use but to be extended so that it will be of a size and nature to be readily observed at a great distance by day or by night and with or without illumination from the headlights of an approaching vehicle.

Another object of the invention is to provide a safety signal which can be easily and inexpensively manufactured from readily available materials and manufactured and sold with the vehicle or independently, as well as a signal which can be quickly applied and utilized to warn approaching or overtaking vehicles.

A further object of the invention is to provide a safety warning signal, of relatively large size, from sheet material, with a warning thereon of contrasting distinctive nature, and all having a reflective surface, and which sheet material is provided with windows through which light from a source behind the same can be readily seen, and with such sheet material spring wound on a roller so that it may be quickly extended with means for holding it in extended position during its display and then after use rolled into a small compact package.

Other objects and advantages of the invention will be apparent from the following description taken in conjunction with the accompanying drawings in which:

FIG. 1 is a perspective illustrating one application of the invention attached to the trunk of an automobile;

FIG. 2, a side elevation with portions of the trunk broken away;

FIG. 3, a rear sectional view on the lines 3—3 of FIG. 2;

FIG. 4, an enlarged fragmentary perspective of the mounting of one end of the roller support;

FIG. 5, an enlarged fragmentary section on the line 5—5 of FIG. 4;

FIG. 6, an enlarged fragmentary perspective illustrating the slot in the weighted end of the sign;

FIG. 7, a rear perspective illustrating the invention attached to a truck; and,

FIG. 8, a perspective looking up under the truck and at the opposite side of the sign shown in FIG. 7.

Briefly stated the invention is a safety warning signal of sheet material spring wound on a roller having means by which it may be detachably secured to the rear interior of a trunk lid in a manner that when the lid is raised the signal can be extended to expose a safety warning signal visible at a great distance sufficiently to give adequate warning to forestall a collision or accident, such sheet material having a reflective surface representative of daylight with a warning carried thereon of red letters indicative of danger, and with a sign so constructed that light behind the same within the trunk will render the sign more plainly visible and substantially impossible to ignore by anyone observing the sign, and with arms which maintain the sign in extended position but which can be readily collapsed to permit the sign to be rolled into a small package.

With continued reference to the drawings the safety signal of the present invention comprises flexible sheet material 10 mounted on a conventional spring wound roller 11, such as shown for example in U.S. Patent No. 2,594,813, attached by means of a bracket 12 with arms 13. The bracket 12 is secured by metal screws 14 to a sub-frame 15 of the trunk lid 16 of an automobile 17, or it may be attached to a truck 18 from which position it can be unrolled or extended.

To a depending arm 13' on the bracket 12 at each end thereof is pivotally attached a rigid arm 19 of sufficient length that its free end may be disposed adjacent the opposite end of the bracket in a suitable clip 12' (FIG. 3) adjacent and such free end removed when therefrom and pivotally lowered the signal is in use to maintain such signal in extended position.

In order to accomplish the dual purpose of providing a weight for the free end of the signal, such free bottom end is formed with a pocket 10' extending the width thereof having a centrally positioned slot 21 in the upper side portion thereof. Within pocket 10' is mounted a weight bar 20 having a centrally positioned vertical slot 20', in registry with the pocket slot 21, in which the free ends of the arms 19 can be engagingly disposed. Due to the fact that when each rigid arm 19 is downwardly depending when engaged in slot 20' the signal will be held in extended position against the action of the spring wound roller but the arms may be readily and manually pivotally removed therefrom.

As another means for securing the signal in extended position it may be provided centrally of the weight bar 20 with a cord 22 and a hook 23 which can be fastened to the portion of the structure on which it is mounted conveniently near to its extended position, for example, the hook may be engaged in the catch 24 in the lower edge of the structure of the automobile 17 or, when the invention is applied to the rear door 25 of a truck, the hook 23 can be attached to the door handle 26 at which time the arms 19 would be held by clips 12' on bracket 12.

The safety warning signal, in addition to the sheet material 10, includes a reflective rearwardly disposed surface 27, preferably white to provide the nearest possible representation to daylight and with lettering 28 thereon, such as the word "Slow" and the word "Danger," with both words in red color internationally used to indicate imminent danger. The red letters 28 are both reflective and have central windows 29 through which light from a trunk or other light 30 can shine and be seen so that the sign will be illuminated and made clearly visible either from light from an outside source or from the trunk light 30. When the sign is used with a truck the lettering will appear on both sides, each having a reflective surface.

It will be understood from the foregoing that the present invention is designed to be used with or without outside means of illumination such as a beam from another light at a distance when carried as the headlight of another automobile or a danger or other light near the signal located in a manner to illuminate the signal. Further the device can be easily and quickly attached to the sub-frame of a trunk lid or to any other part of a truck, trailer or other object without modification of the same, entire installation and preparation for use requiring only the matter of a moment's time.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A safety signal device for automotive and other vehicles,
   said device being comprised of rollable sheet material having reflective surfaces with windows therein through which light can shine to provide a distinctive warning on its surface,
   a rotatably mounted roller supporting said sheet material providing for said sheet material to be rolled and unrolled thereon,
   a bar-type weight attached along the lower edge of said sheet material and having a central recess therein,
   means for attaching said roller to the rear portion of a vehicle,
   a pair of rigid arms each of which is pivotally attached at one end to said means adjacent each end of said roller and each arm being disposable in downwardly extended position with its opposite free end adapted to be located in said recess for acting against said spring roller to maintain said warning signal extended,
   said rigid arms being independently removable from said recess,
   and said roller being spring-wound to dispose said warning signal in a rolled and stored position when said arms are removed from said recess.

2. A safety signal for automotive and other vehicles,
   said signal being of rollable sheet material having a reflective surface with windows through which light can shine,
   said signal having a distinctive warning on its surface,
   a spring roller supporting said sheet material and permitting said sheet material to be rolled and unrolled,
   a bar-type weight attached along the lower edge of said sheet material and having a central elongated recess,
   bracket means adapted for mounting said roller on the rear portion of a vehicle,
   a pair of pivotally mounted separate and rigid bars each of which is attached to said bracket means adjacent each end of said roller and disposable in extended position with the free ends thereof removably positionable in said recess for acting against said spring roller to maintain said warning signal extended, and
   means on said bracket means yieldably securing each said bar in a non-operable position,
   each said bar being manually movable from said recess to said non-operative position whereby said spring roller is operative to dispose said warning signal in a non-signalling stored condition.

3. A safety signal as defined in claim 2 wherein said means on said bracket means yieldably securing each said bar in a non-operative position comprises spring clip members mounted at spaced locations on said bracket for respective engagement with said bars adjacent the free ends thereof.

References Cited by the Examiner

UNITED STATES PATENTS

| | | | |
|---|---|---|---|
| 7,856 | 8/1877 | Seawell | 40—133 |
| 934,489 | 9/1909 | Webb | 40—125 |
| 1,237,104 | 8/1917 | Schumacher | 40—129 |
| 1,442,255 | 1/1923 | Doner | 160—68 |
| 2,193,058 | 3/1940 | Carver | 40—133 |
| 2,212,454 | 8/1940 | Porter | 40—133 |
| 2,594,813 | 4/1952 | Seibert | 40—129 |
| 2,671,423 | 3/1954 | Mead | 40—129 |
| 2,842,881 | 7/1958 | Vidach | 40—133 |

LOUIS J. CAPOZI, *Primary Examiner.*